Oct. 5, 1943.  E. A. DANFORTH  2,330,958
SELF-PROPELLED AMPHIBIAN VEHICLE
Filed June 5, 1942  2 Sheets-Sheet 2

INVENTOR.
Edwin A. Danforth
BY
ATTORNEY

Patented Oct. 5, 1943

2,330,958

UNITED STATES PATENT OFFICE 2,330,958

SELF-PROPELLED AMPHIBIAN VEHICLE

Edwin A. Danforth, Portland, Oreg.

Application June 5, 1942, Serial No. 445,943

4 Claims. (Cl. 115—1)

My invention relates to an amphibian vehicle which is particularly adapted for use as a military machine. One of the principal objects of my invention is to provide a device of this character which will always tend to right itself if it is overturned, independently of whether said overturning occurs on land or on water. To this end this device is made of more or less circular transverse sections and is provided with two driving wheels and one caster-type trailing wheel. Said driving wheels lie within said circular sections and occupy a substantial portion of the longitudinal dimension of said vehicle, the body of said vehicle extends rearwardly of said driving wheels only an amount sufficient to give said vehicle driving stability.

My vehicle might be described as comprising a body and wheel supports therefor which together form a sphere except that the body extends rearwardly therefrom as an elongated cylindrical extension thereof. Upon said elongated extension thereof is a sharpened blade running longitudinally of said body and extending laterally therefrom, said blade and said body constituting together, more or less, with the remainder, a structure concentric with the longitudinal axis of said vehicle.

A further object of my invention is to provide a vehicle of this character in which the driving wheels may constitute reservoirs for air retained under substantial pressure. Said wheels thus provide an auxiliary supply of air for ventilation of the body and air for promoting buoyancy in case it is desired to cut off the interior of said body entirely from the atmosphere, said body being adapted to be made air-tight for this purpose.

A further object of my invention is to provide a device of this character which may be driven at high speed, may be turned quickly either on land or on water, and one in which the ability to turn upon a short radius may be taken advantage of to slash or break down entanglements, and the like, said body being provided with a blade or blades for this purpose which function upon the "switching about" of the rear end of said vehicle.

A further object of my invention is to provide a vehicle of this character which may function wholly independent of the surrounding atmospheric conditions, thus capable of passing thru a body of noxious gas, also one which may traverse difficult terrain either on land or on water or thru swamp lands, and a vehicle which is so constructed as to present no substantially flat surface or opening vulnerable to shell fire.

Further and more detailed objects and features of my invention are hereinafter described with reference to the accompanying drawings, in which.

Figure 1:
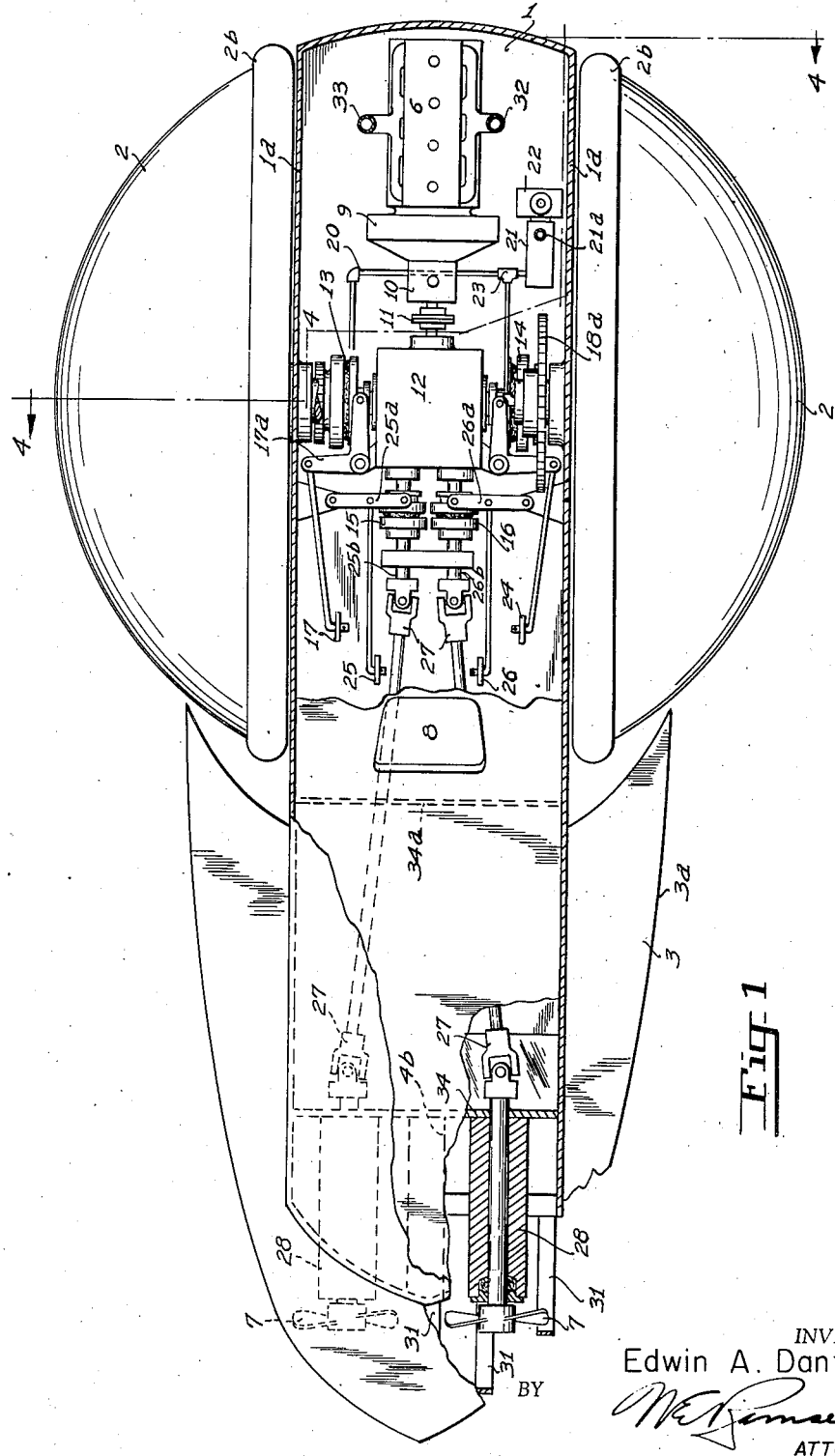
Fig. 1 is a plan view of a vehicle embodying my invention with portions of the body shown broken away to disclose details of construction.

A vehicle embodying my invention comprises a body 1 which is elongated, the rear end of which is of more or less circular section, the forward end having flattened sides 1a. At each side of the forward ends and in close proximity to the flattened sides thereof are two large wheels 2. Said wheels and body form said vehicle into one having a more or less circular cross-section at the forward end. Any transverse section taken thru said vehicle is more or less circular altho diminishing in diameter towards the rearward end.

Extending laterally from the sides of the rearward end of said body are shearing plates 3. Said plates also extend rearwardly of said body and are provided with a sharpened edge 3a. The trailing, rearward end of said body is supported by a caster wheel 4. The driving wheels 2 are independently driven and the caster wheel is merely journalled. Because of said construction said vehicle is adapted to be swung around sharply and the shearing plates 3 may be used to slash pickets, entanglements, and the like, and are brought into play by said sudden swinging or switching about of said vehicle when said vehicle is thus sharply turned. The body of said vehicle is adapted to be made air-tight. For this purpose of providing access into said body I provide a relatively flat turret 5 which is removable. Said turret has a number of ports or apertures 5a therein which may be used to promote visibility from within the body of said vehicle, or for firing slots. It is possible also that said turret may be removed so that the entire aperture covered thereby will be open. I propose that said ports or apertures will have means provided for covering them so that said turret may be made as air-tight as is the remainder of said body. I have not illustrated any specific means for attachably securing said turret to said body such as by hinges or by locking devices, nor have I shown any specific means for sealing off said ports or apertures. Said devices might take a number of alternative forms which will readily suggest themselves to a person skilled in the art.

Within said body is housed an engine 6 and power transmission mechanism 12 appropriate for driving the wheels 2 selectively and I also illustrate means by which power may be applied to said wheels or to propellers 7. I preferably provide mechanism which permits either or both of said wheels or either or both of said propellers to be operatively engaged or disengaged by the selection of an operator sitting on seat 8. To this end I provide the type of power transmitting mechanism commonly provided in automobile construction. That is, I provide a clutch 9, a selective power transmission 10, and a flexible coupling 11 joined to the propelling devices. To provide for said selective operation of said wheels and said propeller I provide a power transmission, diagrammatically illustrated as 12, having two laterally spaced selective clutches 13 and 14 at the sides thereof to which power may be transmitted to the wheels 2 and two selective clutches 15 and 16 by which power may be transmitted to the propellers 7.

Figure 4:
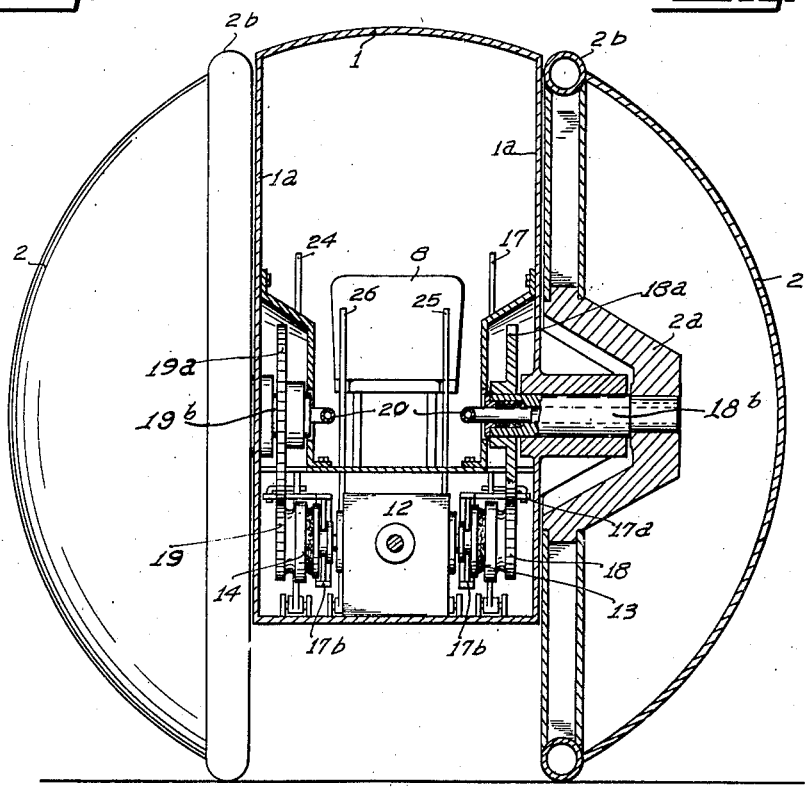
Fig. 4 is a transverse section therethru taken on the line 4—4 in Fig. 1.

Referring first to the power transmission elements for the wheels, this may be best viewed in Fig. 4. The right-hand clutch 13, as viewed in said figure, may be thrown into and out of engagement by hand lever 17, which acts thru bell crank lever 17a and clutch engaging sleeve 17b. To the driven half of said clutch, I secure gear 18 which meshes with gear 18a fixed to driving sleeve 18b keyed or otherwise secured to the hub 2a of said right-hand wheel 2. A similar pair of gears 19 and 19a and sleeve transmits power from the left-hand shaft, as viewed in Fig. 4, to the left-hand wheel 2 of said vehicle. Each of said wheels preferably is provided with a tire 2b. Said tire preferably comprises an annular metal member extending about the periphery thereof. I do not deem my invention limited to metallic tires or annular members of this character, but deem said construction preferable. Entering the bores of each of said sleeves 18b and 19b are air conduits 20 which lead to an air compressor 21 driven by a small motor 22. A valve 23 serves to open or close the air conduit leading to said wheels and also permits the discharge of air from said wheels and said conduit into the body 1 of said vehicle. I propose that such type of motor driven compressor will be used as is conventionally provided for maintaining air reservoirs at a desired pressure. Thus, if I wish to maintain air under substantial pressure in each of said wheels said motor driven compressor is adapted to operate until said pressure is attained and it then will cut off. I prefer to provide a structure which is automatic in operation and provide an air intake pipe 21a leading to the exterior of the body. The air in said wheels tends to promote buoyancy thereof in case said vehicle is to be propelled in water. The valve 23 is adapted to control the discharge of air from said wheels, to provide ventilation for the body, and also may be used to increase the air pressure in the body above atmospheric if it is deemed necessary or desirable to do so, to provide buoyancy for the body in addition to the buoyancy of the wheels thereof. While I mentioned that air may be maintained in the wheels at a substantial pressure, I do not wish this to be considered a critical factor but do contemplate that air will be maintained in the wheels substantially above atmospheric pressure so as to provide a substantial air capacity therein for ventilating the body for substantial periods of time in case said vehicle is being operated in an area in which noxious gases are present and it is desired not to operate said air compressor. Although I specify that the body of said vehicle is maintained airtight, I recognize the fact that this is quite difficult of accomplishment. If the air pressure within said body is maintained at a pressure substantially above atmospheric pressure then any leakage will be from the body outwardly and if any leaks in said body should develop then the flow of fluid inwardly into said body will be prevented because of the escape of air under substantial pressure outwardly through any leakage point. I feel that this is a point of importance in connection with a vehicle embodying my invention because it is designed to traverse rough country and will be subject to severe blows and this method of preventing leakage provides an effective measure in preventing water, gas, or other seepage from flowing into the body or wheels of said vehicle.

If said vehicle is to be floated upon a body of water and is to be propelled therein, the propellers are then engaged to the power transmission 12 by clutches 15 or 16, or both of them. In such event, power can be cut off from the wheels 2 by manipulation of hand levers 17 or 24, or said wheels as well as said propellers may be engaged so that all are driven simultaneously. If the wheels 2 are to be used as an aid in driving said vehicle while it is buoyantly supported upon a body of water, it would be desirable to make the wheels 2 ribbed. In traversing rough ground the ribbing of said wheels or the tire portions thereof might be desirable. I believe that the advantage of the smoothness of said wheels offers greater advantage, however, in preventing said device from picking up foreign objects, mud, and the like, and thus I have illustrated them of this form. Power to said propellers is selectively applied by actuation of hand levers 25 and 26, respectively, to the left and right hand propellers, as viewed in Fig. 1, which propellers act through links 25a and 26a, respectively, to engage and disengage clutches 15 and 16, respectively, to propeller shafts 25b and 26b, respectively. Each of said propeller shafts is provided with universal joints 27 and with a stern bearing 28. Said stern bearings are spaced apart from the longitudinal center-line of said body so that the two spaced propellers may be used for steering said vehicle in a body of water as well as propelling it in the usual manner of said propellers. I preferably form a tunnel 29 aft of a slanting bulkhead 30 to which the stern bearings are attached so that water may readily flow through said tunnel and to said propellers in an effective manner. I also preferably provide a slatted guard 31 about the propellers, extending below and aft thereof so that said propellers will not become damaged or fouled. It is to be noted in Figs. 1 and 2 that the shearing plate 3 overlies said propellers and said shearing plate also serves to guard said propellers to a degree from above. The caster wheel 4 is carried in a bearing 4a alined with the central partition 4b extending longitudinally of tunnel 29. Said partition provides a strong support for said caster wheel bearing.

Figures 2, 3:
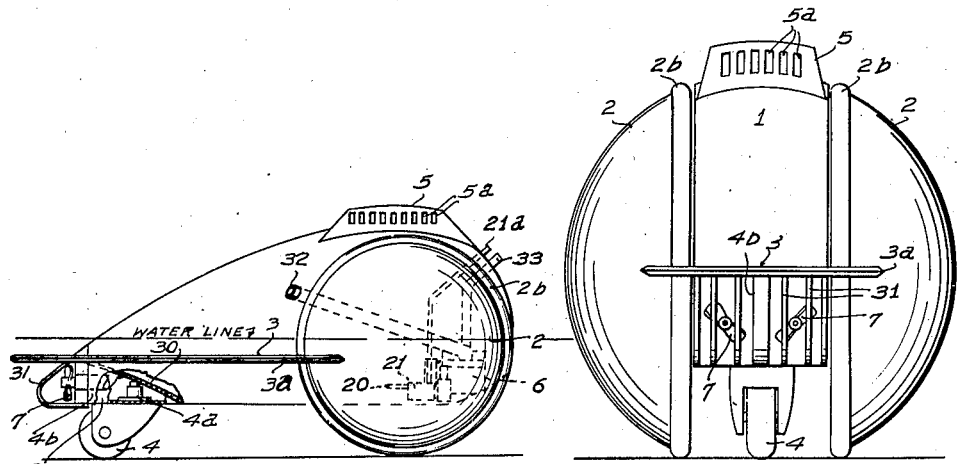
Fig. 2 is a side elevation of said vehicle taken on a substantially smaller scale.
Fig. 3 is an elevation thereof looking at the rear end of said vehicle.

The water line of said vehicle is indicated in Fig. 2. The height of the water line, of course, will vary with the buoyancy of said device but it is indicated for the purpose of showing that the outlet for exhaust pipe 32 lies above said water line and it preferably lies rearwardly of the turret 5, so that if said turret is uncovered or removed that the gases will not pass downwardly within the body of the vehicle. The intake pipe 21a for compressor 21 and the intake pipe 33 for motor 22 also open externally of the body above said water line and preferably lie forwardly of the turret and are thus separated from the exhaust pipe so that the products of combustion discharged from said exhaust pipe will not tend to foul the air taken in thru said pipes 33 and 21a, particularly the latter.

I have illustrated the vehicle embodying my invention as being of a size capable of accommodating one or two men. It is assumed that the body has compartments built therein for storing fuel, water, ammunition, supplies, and equipment, but I have made no effort to show this structure in detail except that I show more or less diagrammatically space for said storage between bulkheads 34 and 34a in Fig. 1. The remaining space may be used to house machinery as is shown and one or more occupants. The driver of the vehicle is adapted to sit upon seat 8 with the various control levers grouped about him. He can see thru the ports or apertures 5a in turret 5 and if the vehicle is adapted for operation by one man, he can aim and discharge fixed or movable guns thru said apertures. If more than one man is housed in the body of said vehicle, then said multiple duties can be divided in the usual manner between said several occupants.

It is contemplated that said vehicle may be adapted for relatively high speed and if it tends to overturn due to rough terrain it will tend to come to rest as is indicated because the under surface of the wheels define a flat plane as is shown in Figs. 3 and 4. The remainder of the circumference of said body and wheels is more or less truly circular. The center of gravity of said device is low, as is indicated by the placement of the machinery in Fig. 4, and thus because of said low center of gravity and said flat plane, said device will tend to right itself. Thus, said vehicle may roll down a bank and when it reaches the bottom it will arrange itself right side up and be capable of being driven off without the occupant or occupants leaving the body of said vehicle. Said vehicle may be driven by one or both of said wheels or by one or both of said propellers or any combination thereof. If one wheel is operated and the other remains at rest, said vehicle tends to spin about said latter wheel and the tail of the body tends to sweep about with a slashing motion. Thus, in traversing a thicket, a driver could cause the vehicle to spin about in this fashion to slash down growth or entanglements so that said device could cut its way thru obstructions which would otherwise impede its progress. The occupants of said vehicle are also independent of external conditions because of the air supply in the wheels and in case of gas attack the operator could adjust the valve 23 so as to cut off the compressor and the intake pipe 21a and permit air to be discharged from the hollow wheels. Said hollow wheels also lie laterally of the space occupied by the operator while seated upon seat 8. Said wheels thus serve to protect said operating chamber and to insulate it. It is to be noted that the wheels lie closely adjacent the flattened sides 1a of the body 1 and it is contemplated that this space shall approximate a running clearance and no more.

I claim:

1. In a self-propelled vehicle having a body, a pair of alined traction wheels arranged at the sides thereof and a supporting wheel spaced therefrom, said body and said traction wheels lying wholly within and defining a substantially circular transverse contour terminating in a plane, said plane being defined by the under surface of said wheels, said body defining a spherical portion at the forward end and a rearwardly projecting portion, said rearwardly projecting portion being substantially of smaller diameter than said forward end, said pair of traction wheels being driven independently of each other thereby to swing said rearwardly projecting portion about and a laterally projecting cutting blade extending longitudinally of the exterior of said body.

2. In a self-propelled vehicle having a body, a pair of alined traction wheels arranged at the sides thereof and a supporting wheel spaced therefrom, said body and said traction wheels lying wholly within and defining a substantially circular transverse contour terminating in a plane, said plane being defined by the under surface of said wheels, said body defining a spherical portion at the forward end and a rearwardly projecting portion, said rearwardly projecting portion being substantially of smaller diameter than said forward end, said pair of traction wheels being driven independently of each other thereby to swing said rearwardly projecting portion about, a laterally projecting cutting blade extending longitudinally of the exterior of said body, said cutting blade extending along both sides of said rearwardly projecting portion and rearwardly thereof.

3. In a self-propelled amphibian vehicle having a body, a pair of alined traction wheels arranged at the sides thereof and a supporting wheel spaced therefrom, said body being capable of being rendered air-tight, said traction wheels being hollow and defining air reservoirs to promote buoyancy of said entire vehicle, conduits leading from the interior of said wheels to the interior of said body, and means for regulating the flow of air between said wheels and said body.

4. In a self-propelled amphibian vehicle having a body, a pair of alined traction wheels arranged at the sides thereof and a supporting wheel spaced therefrom, said body and said traction wheels lying wholly within and defining a substantially circular transverse contour terminating in a plane of lesser width than the diameter of said circular contour, said plane being defined by the under surface of said wheels, said body defining a spherical portion at the forward end and a rearwardly projecting portion, said rearwardly projecting portion being substantially of smaller diameter than said forward end, a pair of devices driven independently of each other thereby to swing said rearwardly projecting portion about, said body being capable of being rendered air-tight, said traction wheels being hollow and defining air reservoirs to promote buoyancy of said entire vehicle, conduits leading from the interior of said wheels to the interior of said body and means for regulating the flow of air between said wheels and said body.

EDWIN A. DANFORTH.